(12) United States Patent
Kim et al.

(10) Patent No.: US 7,746,329 B2
(45) Date of Patent: Jun. 29, 2010

(54) DISPLAY APPARATUS AND A METHOD OF CONTROLLING THE SAME

(75) Inventors: Young-chan Kim, Bulwang-si (KR); Mi-sook Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1284 days.

(21) Appl. No.: 11/000,999

(22) Filed: Dec. 2, 2004

(65) Prior Publication Data

US 2005/0116884 A1 Jun. 2, 2005

(30) Foreign Application Priority Data

Dec. 2, 2003 (KR) .................. 10-2003-0086944
Jan. 26, 2004 (KR) .................. 10-2004-0004728

(51) Int. Cl.
*G06F 3/038* (2006.01)
(52) U.S. Cl. .................. 345/204; 345/530; 345/536
(58) Field of Classification Search .............. 345/204, 345/211–213, 530, 536, 543, 544
See application file for complete search history.

(56) References Cited

U.S. PATENT DOCUMENTS

| 5,809,245 | A * | 9/1998 | Zenda .................. 709/217 |
| 6,373,476 | B1 * | 4/2002 | Dalgleish et al. .......... 345/204 |
| 7,295,194 | B2 * | 11/2007 | Lee .................. 345/204 |
| 2002/0036631 | A1 * | 3/2002 | Perez .................. 345/204 |
| 2002/0087284 | A1 | 7/2002 | Mueller |
| 2003/0025685 | A1 * | 2/2003 | Shirasaki et al. .......... 345/204 |
| 2003/0214507 | A1 * | 11/2003 | Mawatari et al. .......... 345/530 |
| 2004/0212610 | A1 * | 10/2004 | Hamlin .................. 345/211 |

FOREIGN PATENT DOCUMENTS

| CN | 1592922 | 3/2005 |
| EP | 1316880 A | 6/2003 |
| JP | 1-150297 | 6/1989 |
| JP | 08234878 | 9/1996 |
| JP | 11-231994 A | 8/1999 |
| JP | 11-249970 | 9/1999 |
| JP | 11344962 | 12/1999 |
| JP | 2000-194346 A | 7/2000 |
| KR | 41993-5396 | 3/1993 |
| KR | 1993-0011347 | 11/1993 |
| KR | 10-0253328 | 1/2000 |
| KR | 2000-24791 A | 5/2000 |

(Continued)

OTHER PUBLICATIONS

International Search Report (International Application No. PCT/KR2004/002009) filed Aug. 10, 2004.

(Continued)

*Primary Examiner*—Kimnhung Nguyen
(74) *Attorney, Agent, or Firm*—Stanzione & Kim, LLP

(57) ABSTRACT

A display apparatus include a connector, a readable/writable EDID storage to store EDID, and a controller to control the EDID storage to be write-protected from error data transmitted from a computer through the connector. With this configuration, the display apparatus and a method of controlling the same can prevent error data from being stored in an EDID storage.

25 Claims, 15 Drawing Sheets

FOREIGN PATENT DOCUMENTS

KR          20-255612          11/2001

OTHER PUBLICATIONS

Chinese Office Action dated Dec. 21, 2007 issued in CN 2004800354246.
Data Sheet: "PCB2421 1k dual mode serial EEPROM" Apr. 1, 1997, Philips Electronics N. V., The Netherlands, XP002532639 *the whole document*.
VESA (Video Electronics Standards Association): "VESA Enhanced Extended Display Identification Data—Implementation Guide (Version 1.0)" Internet Citation [Online] Jan. 4, 2001, XP007901938 Retrieved from the Internet: URL:http://www.vesa.org/public/EEDIDguideV1.pdf> [retrieved on Apr. 3, 2007] *the whole document*.
Dalgleish et al: "Extended Display Identification Data Programming of Microprocessor-Based Display Data Channel Design" IP.COM Journal, IP.COM., West Henrietta, NY, US, Mar. 1, 1995, XP013103049 ISSN: 1533-0001 *the whole document*.
VESA: "Vesa Plug and Display Standard Version 1.0" Internet Citation, [Online] XP002123075 Retrieved from the Internet: URL:http://www.vesa.org> [retrieved on Nov. 10, 1999] *the whole document*.
European Search Report issued Jun. 30, 2009 in EP Application No. 04748529.7.

* cited by examiner

DISPLAY APPARATUS AND A METHOD OF CONTROLLING THE SAME

CROSS-REFERENCE TO RELATED APPLICATIONS

This application claims the benefit of Korean Patent Application No. 2003-86944, filed Dec. 2, 2003, and Korean Patent Application No. 2004-4728, filed Jan. 26, 2004 in the Korean Intellectual Property Office, the disclosure of which is incorporated herein by reference.

BACKGROUND OF THE INVENTION

1. Field of the Invention

The present invention relates to a display apparatus and a method of controlling the same, and more particularly, to a display apparatus and a method of controlling the same, which can prevent error data from being stored in an extended display identification data (EDID) storage.

2. Description of the Related Art

Recently, a display apparatus with Plug and Play functionality has been greatly universalized.

The display apparatus with the Plug and Play functionality can exchange information with a computer while a conventional display apparatus only receives a signal from the computer. When the display apparatus is just plugged into the computer and turned on, such display apparatus with the Plug and Play functionality allows the computer to automatically optimize user environments relating to the display apparatus and also allows a user to directly use the display apparatus.

To provide the Plug and Play functionality to the display apparatus, the display apparatus must previously store extended display identification data (EDID), such as a manufacturer identification (ID), a model name ID, a display power management signaling function supportability, etc., and a protocol for data communication between the display apparatus and the computer must be previously set.

Therefore, a display data channel (DDC) standard was created by the video electronic standard association (VESA) to define a standard for the data communication of the display apparatus having the Plug and Play functionality.

The DDC standard defines data communication channels between the display apparatus and the computer as a protocol for transmitting display data stored in the display apparatus to the computer or changing the display data through a keyboard, a mouse, etc.

The DDC standard includes various DDC levels such as DDC1, DDC2B, etc.

In the DDC1, the display data is transmitted from the display apparatus to the computer one bit by one bit in correspondence to a vertical synchronous signal transmitted from the computer. As long as the vertical synchronous signal is inputted to the display apparatus, the display apparatus continuously and circularly transmits the EDID having a data size of 128-bytes to the computer.

In the DDC2B, when the computer asks for the EDID of the display apparatus through a serial data line (SDA) and a serial clock line (SCL), the display apparatus transmits the EDID to the computer through the SDA.

FIG. 1 is a block diagram of an EDID storage and peripherals in a conventional display apparatus.

As shown in FIG. 1, in a conventional display apparatus, an EDID storage 110 is operated by at least one of a display power and a computer power. Further, the EDID storage 110 includes a write-protect (WP) port being grounded.

Here, when the WP port is in a high state, it is allowed to only read data from the EDID storage 110. In contrast, when the WP port is in a low state, it is allowed to read data from and write data to the EDID storage 110.

However, the conventional display apparatus is allowed to write data to the EDID storage 110 so long as the computer power is supplied to the EDID storage 110 regardless of the display power. Therefore, error data may be unexpectedly written to the EDID storage 110 because of an electrostatic discharge (ESD) or application malfunction while the computer is being used.

Further, in a case when the computer is turned off while accessing the EDID storage 110 to read the EDID, the data communication is interrupted and therefore the EDID storage 110 cannot receive a clock signal from the computer through the SCL, so that the EDID storage 110 becomes abnormal.

Further, in a case when the computer is turned on while the EDID storage 110 is operated by the display power, the EDID storage 110 may be supplied with an unstable power due to the computer power. In this case, if the computer accesses the EDID storage 110, the data communication is inaccurately performed.

SUMMARY OF THE INVENTION

In order to solve the above-mentioned and/or other problems, it is an aspect of the general inventive concept to provide a display apparatus and a method of controlling the same, which can prevent error data from being stored in an EDID storage.

Another aspect of the general inventive concept is to provide a display apparatus and a method of controlling the same, which can prevent DDC functionality from malfunction.

Additional aspects and/or advantages of the invention will be set forth in part in the description which follows and, in part, will be obvious from the description, or may be learned by practice of the invention.

The foregoing and/or other aspects of the general inventive concept are achieved by providing a display apparatus including a connector, a readable/writable EDID storage to store EDID, and a controller to control the EDID storage to be write-protected from error data transmitted from a computer through the connector.

According to an aspect of the general inventive concept, the connector can be selectively connected with a video card of the computer or an EDID storage jig to store the EDID, and can output a determining signal according to a determination of what is connected to the connector, and the controller can control the EDID storage to be write-protected from the error data when the controller determines that the video card is connected, and can control the EDID storage to store the EDID transmitted from the EDID storage jig when the controller determines that the EDID storage jig is connected, on the basis of the determining signal.

According to another aspect of the general inventive concept, the EDID storage may include a write-protect (WP) port, and the controller may include a microcomputer to transmit an enable signal or a disable signal to the WP port according to the determining signal of the connector.

According to another aspect of the general inventive concept, the controller can control the EDID storage to initialize a communication condition of the EDID storage when the controller determines that the video card is connected, on the basis of the determining signal.

According to yet another aspect of the general inventive concept, the EDID storage may include an I²C line port, and the controller can determine whether an I²C line is accessible when the video card is connected, and can transmit a driving signal to the I²C line port to initialize the communication condition of the EDID storage when the I²C line is accessible.

According to yet another aspect of the general inventive concept, the driving signal may include a stop condition signal to stop data transmission.

According to still another aspect of the general inventive concept, the EDID storage may include a power input port to receive a display power or a computer power, and the controller can control the EDID storage to be write-protected from the error data when the controller determines that the computer power is supplied through the power input port.

According to still another aspect of the general inventive concept, the EDID storage may include a WP port, and the controller may include a current passage to connect a computer power line with the WP port.

According to still another aspect of the general inventive concept, the EDID storage may include a WP port, and the controller may include a microcomputer to transmit an enable signal or a disable signal to the WP port according to a determination of whether the computer power is supplied.

According to still another aspect of the general inventive concept, the controller can control the EDID storage to initialize a communication condition of the EDID storage when the controller determines that the computer power is supplied.

According to still another aspect of the general inventive concept, the EDID storage may include an I²C line port, and the controller can determine whether an I²C line is accessible when the computer power is supplied, and transmits a driving signal to the I²C line port to initialize the communication condition of the EDID storage when the I²C line is accessible.

According to still another aspect of the general inventive concept, the driving signal may include a stop condition signal to stop data transmission.

According to still another aspect of the general inventive concept, the EDID storage may include a power input port to receive display power or computer power, and a WP port being enabled when the computer power is supplied through the power input port, and the controller can control the EDID storage to be write-protected from the error data when the controller determines that the display power is supplied while the computer power is supplied.

According to still another aspect of the general inventive concept, the display apparatus may further include a switch to switch the WP port between enable and disable modes, and the controller may include a microcomputer to control the switch to enable the WP port when the controller determines that the display power is supplied.

According to still another aspect of the general inventive concept, the display apparatus may further include a selector to select the WP port to be disabled, and the controller can control the switch to disable the WP port according to selection of the selector.

According to still another aspect of the general inventive concept, the controller may include a microcomputer to output a first control signal when the display power is initially supplied while the computer power is being supplied, a first switch to output a second control signal in response to the first control signal of the microcomputer, and a second switch to switch the WP port between enable and disable modes in response to the second control signal of the first switch.

The above and/or other aspects of the general inventive concept may also be achieved by providing a method of controlling a display apparatus having a connector and a readable/writable EDID storage to store EDID, the method including controlling the EDID storage to be write-protected from error data transmitted from a computer through the connector.

According to an aspect of the general inventive concept, the controlling of the EDID storage may include allowing the connector to output a determining signal according to a determination of whether the connector is selectively connected with a video card of the computer or an EDID storage jig, to store the EDID, and controlling the EDID storage to be write-protected from the error data when it is determined that the video card is connected, and controlling the EDID storage to store the EDID transmitted from the EDID storage jig when it is determined that the EDID storage jig is connected, on the basis of the determining signal of the connector.

According to an aspect of the general inventive concept, the method may further include controlling the EDID storage to initialize a communication condition of the EDID storage when it is determined that the video card is connected, on the basis of the determining signal of the connector.

According to another aspect of the general inventive concept, the controlling of the EDID storage may include controlling the EDID storage to be write-protected from the error data when it is determined that computer power is supplied.

According to yet another aspect of the general inventive concept, the method may further includes controlling the EDID storage to initialize a communication condition of the EDID storage when it is determined that the computer power is supplied.

According to still another aspect of the general inventive concept, the controlling of the EDID storage may include enabling a WP port when the EDID storage is supplied with computer power, and controlling the EDID storage to be write-protected from the error data transmitted from the computer when it is determined that display power is supplied.

According to still another aspect of the general inventive concept, the method may further include receiving a selection signal to disable the WP port, and controlling the WP port to be disabled according to the selection signal.

BRIEF DESCRIPTION OF THE DRAWINGS

These and/or other aspects and advantages of the general inventive concept will become apparent and more readily appreciated from the following description of the embodiments, taken in conjunction with the accompany drawings of which.

DETAILED DESCRIPTION OF THE PREFERRED EMBODIMENTS

Figure 1:
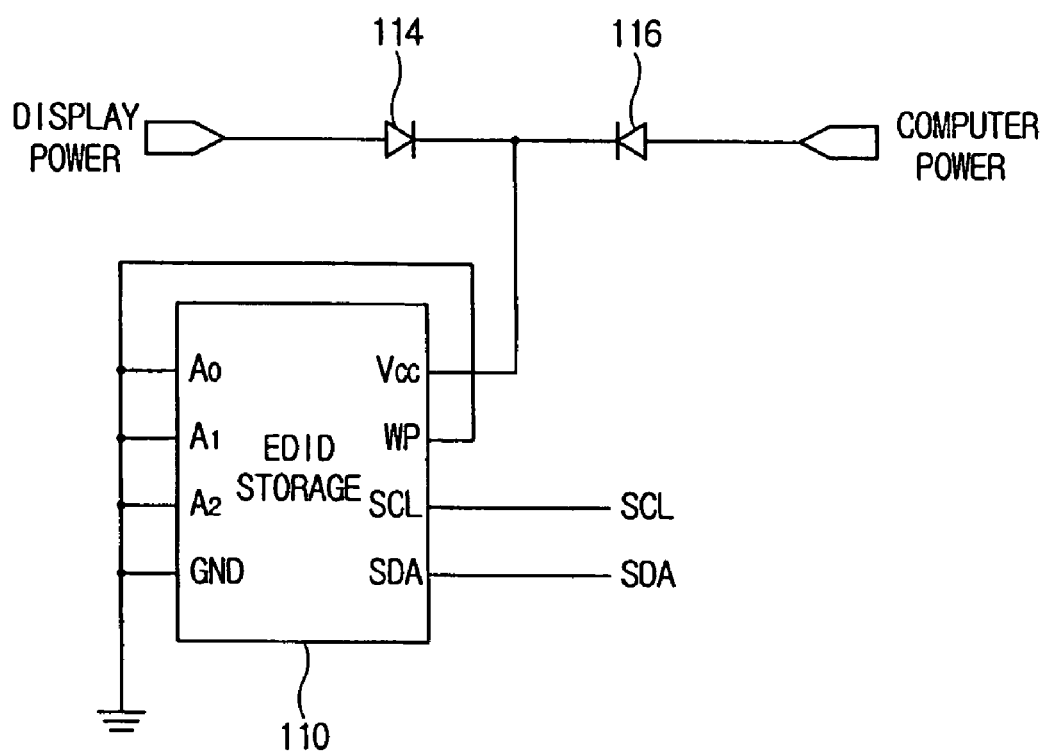
FIG. 1 is a block diagram of an EDID storage and peripherals in a conventional display apparatus.

Reference will now be made in detail to the embodiments of the general inventive concept, examples of which are illustrated in the accompanying drawings, wherein like reference numerals refer to like elements throughout. The embodiments are described below in order to explain the embodiments of the general inventive concept by referring to the figures.

Figure 2:
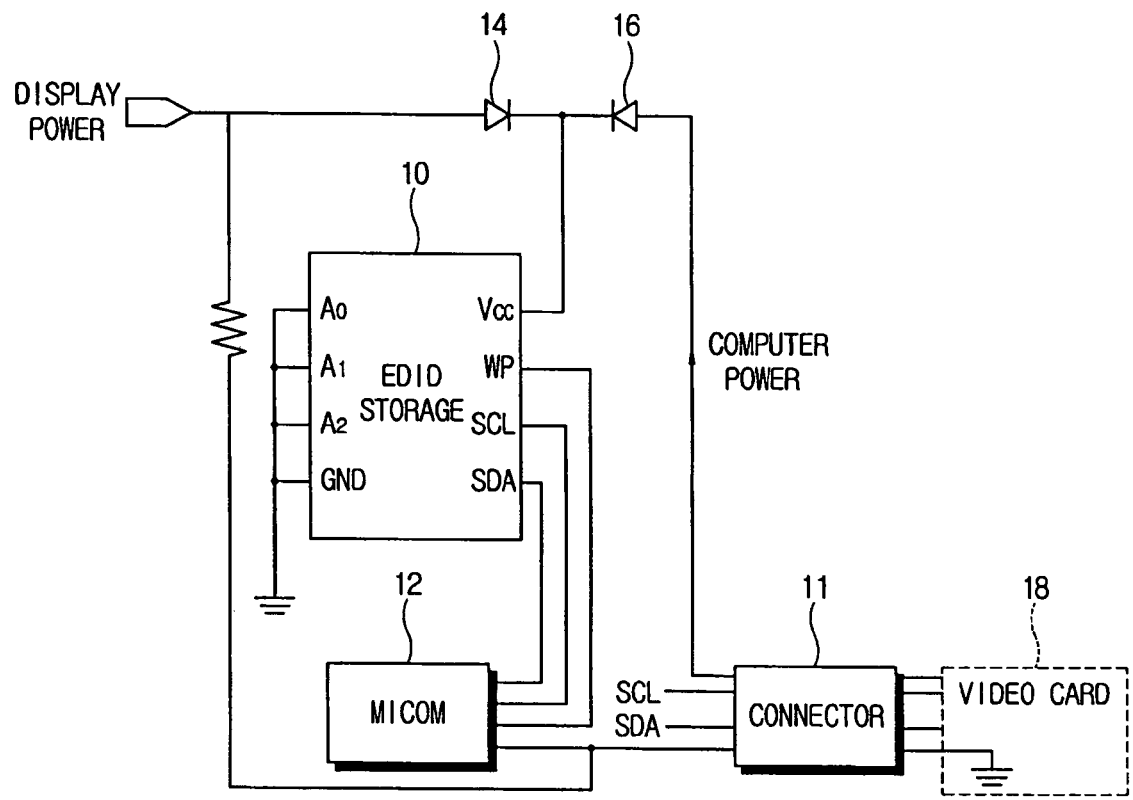
FIG. 2 is a block diagram of a display apparatus to be connected to a video card according to an embodiment of the general inventive concept.
Figure 3:
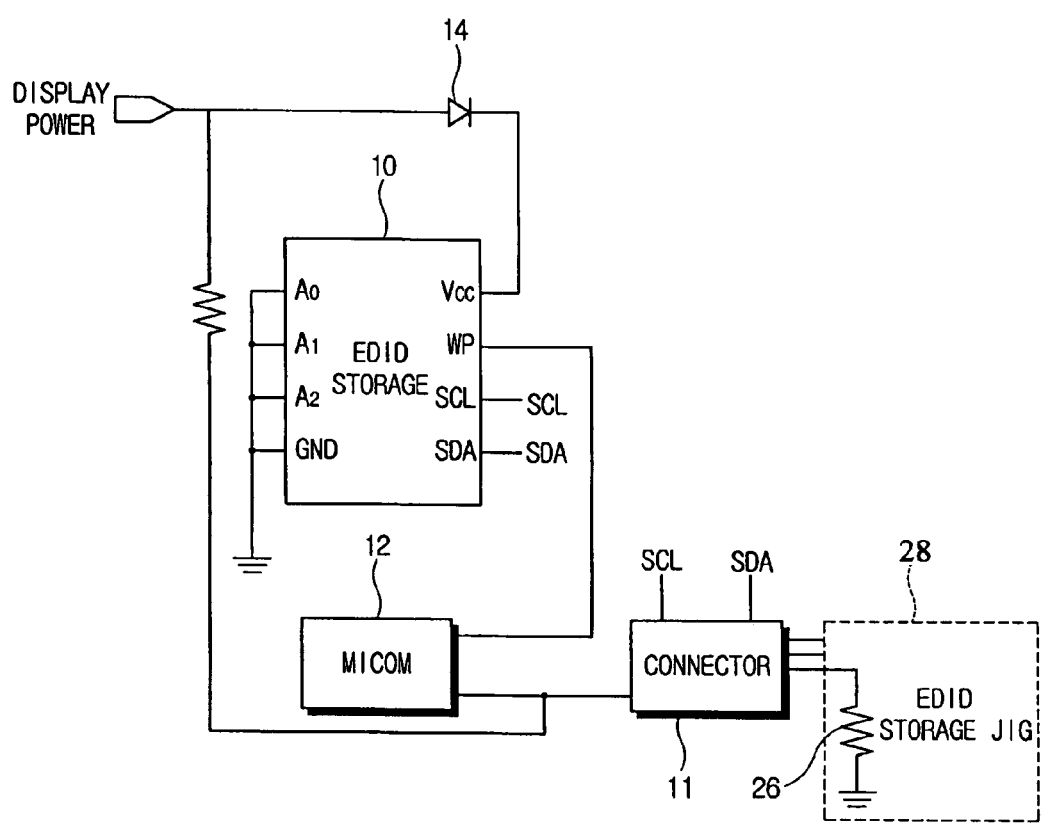
FIG. 3 is a block diagram of the display apparatus as illustrated in FIG. 2 to be connected with an EDID storage jig.

FIGS. 2 and 3 are block diagrams of a display apparatus according to an embodiment of the general inventive concept. As shown in FIGS. 2 and 3, the display apparatus may include a connector 11 to which a video card 18 of a computer or an EDID storage jig 28 can be selectively connected, an EDID storage 10 to store the EDID, and a microcomputer 12 to control the EDID storage 10 according to a determination of what is connected to the connector 11.

It is noted that other external devices can be connected to the display device alternatively. The connector 11 may be a D-sub connector, a digital video interface (DVI) connector, etc., to which the video card 18, the EDID storage jig 28, etc., is selectively connected through one or more lines coupled between the display apparatus and the external device.

As shown in FIG. 2, when the video card 18 is connected to the connector 11, the connector 11 can output a ground voltage as a ground terminal of the video card 18 and a part of the connector 11 are connected. Further, as shown in FIG. 3, when the EDID storage jig 28 is connected to the connector 11, the connector 11 can output a predetermined voltage due to a resistor 26 provided in the EDID storage jig 28. That is, the connector 11 generates one of the grounded voltage and the predetermined voltage as a determining signal according to the determination of what is connected to the connector 11, thereby transmitting the determining signal to the microcomputer 12.

The EDID storage 10 may include an electrically erasable programmable read only memory (EEPROM) to store the EDID therein. In an aspect of this embodiment of the general inventive concept, the data size of the EDID is 128-byte as shown in the following <Table 1>.

TABLE 1

| Size (total 128 byte) | EDID |
|---|---|
| 8 byte | Header |
| 10 byte | Manufacturer/product discriminating code |
| 2 byte | EDID format version |
| 15 byte | Basic display parameter/property |
| 19 byte | Extended/Standard timing |
| 72 byte | Timing & monitor specification |
| 1 byte | Extended flag |
| 1 byte | Checksum |

The EDID storage 10 may include a Vcc port to receive a display power or a computer power, a write-protect (WP) port, and a serial clock line (SCL) port and a serial data line (SDA) port used as an I$^2$C line port to communicate with the microcomputer 12 and the video card 18.

The display power transmitted through a diode 14 or the computer power transmitted from the video card 18 and through a diode 16 can be supplied to the EDID storage 10 through the Vcc port. Here, the EDID storage 10 can be operated by at least one of the display power and the computer power.

Further, when the WP port is in a high state, it is allowed to only read data from the EDID storage 10. In contrast, when the WP port is in a low state, it is allowed to read and write data to the EDID storage 10.

The SCL and SDA ports of the EDID storage 10 can be connected to the video card 18 through the connector 11, thereby forming an I$^2$C communication interface between the EDID storage 10 and the video card 18. Further, the SCL and SDA ports can be connected to the microcomputer 12, thereby allowing the EDID storage 10 to communicate with the microcomputer 12.

The microcomputer 12 can determine whether the video card 18 or the EDID storage jig 28 is connected to the connector 11, on the basis of the determining signal generated by the connector 11.

As shown in FIG. 2, in the case where it is determined that the video card 18 is connected to connector 11, the microcomputer 12 can transmit a high signal as an enable signal to the WP port of the EDID storage 10.

On the other hand, as shown in FIG. 3, in the case where it is determined that the EDID storage jig 28 is connected to the connector 11, the microcomputer 12 can transmit a low signal as a disable signal to the WP port of the EDID storage 10.

Thus, in the case where the video card 18 is connected to the connector 11, write-protection of the EDID storage 10 can be enabled, thereby preventing accidental error data transmitted from the computer from being stored in the EDID storage 10. Further, in the case where the EDID storage jig 28 is connected to the connector 11, the write-protection of the EDID storage 10 can be disabled, thereby allowing the normal EDID to be stored in the EDID storage 10. The normal EDID is transmitted from the EDID storage jig 28 to the SCL and SDA ports of the EDID storage 10 through SCL and SDA of the connector 11.

Further, in the case where it is determined that the video card 18 is connected to the connector 11, the microcomputer 12 determines whether an I$^2$C line is accessible. As a result of the determination, when the I$^2$C line is accessible, the microcomputer 12 transmits a stop condition signal to both SCL and SDA ports so as to initialize a communication condition of the EDID storage 10.

Figure 10:
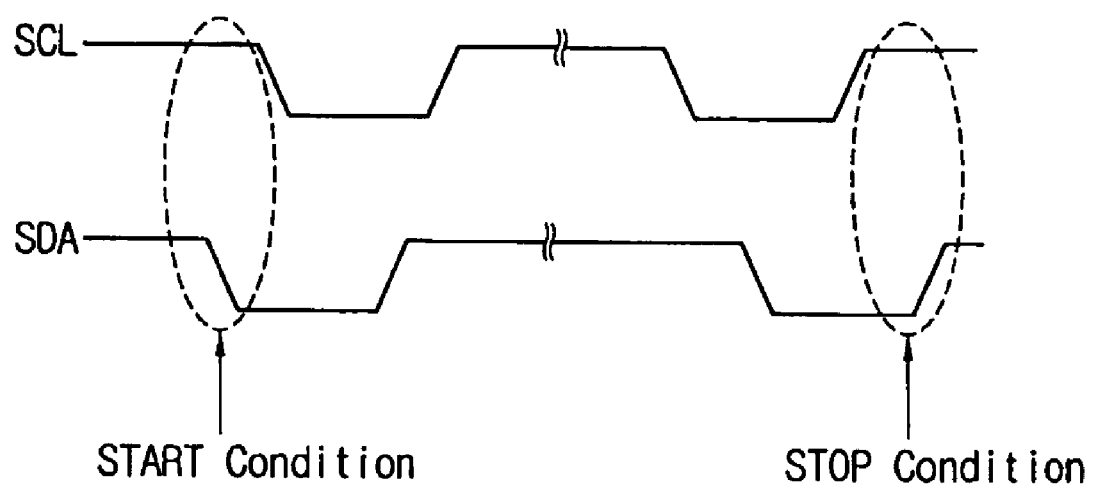
FIG. 10 illustrates an example of start and stop conditions of SCL and SDA signals in the display apparatuses according to the embodiments of the general inventive concept.

Hereinbelow, the stop condition signal will be described with reference to FIG. 10.

Generally, a communication condition of a SCL and a SDA can be divided into a busy condition, a start condition, a data transmission condition, and a stop condition.

In the busy condition, an SCL signal and an SDA signal may both be high. In the start condition, the SCL signal may be high and the SDA signal may be changed from a high state into a low state. In the stop condition, the SCL signal may be high and the SDA signal may be changed from a low state to a high state.

That is, the microcomputer 12 can transmit several times the SCL and SDA signals corresponding to the stop condition to the SCL and SDA ports of the EDID storage 10, thereby initializing the communication condition of the EDID storage 10.

With this configuration, operations of the display apparatus according to the embodiment of FIGS. 2 and 3 will be described hereinbelow with reference to FIGS. 11 and 12.

Figure 11:
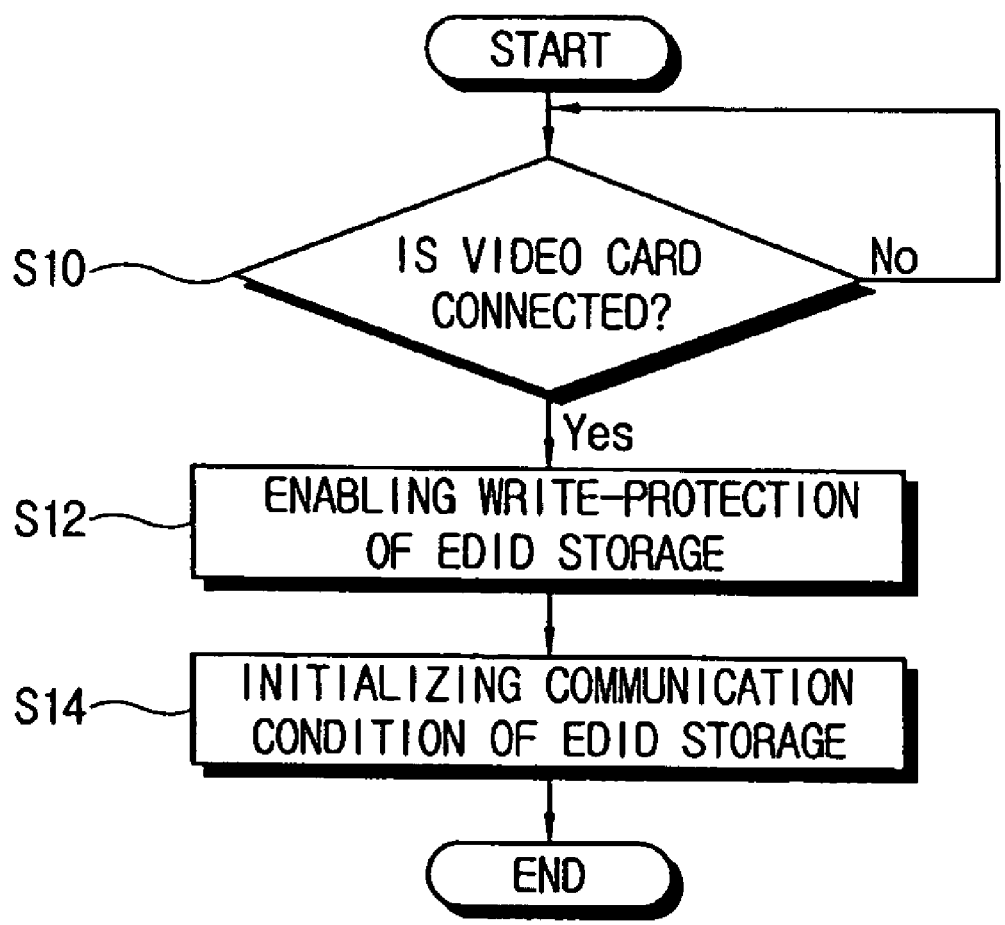
FIGS. 11 and 12 illustrate methods of operating the display apparatus of FIGS. 2 and 3 according to another embodiment of the general inventive concept.
Figure 12:
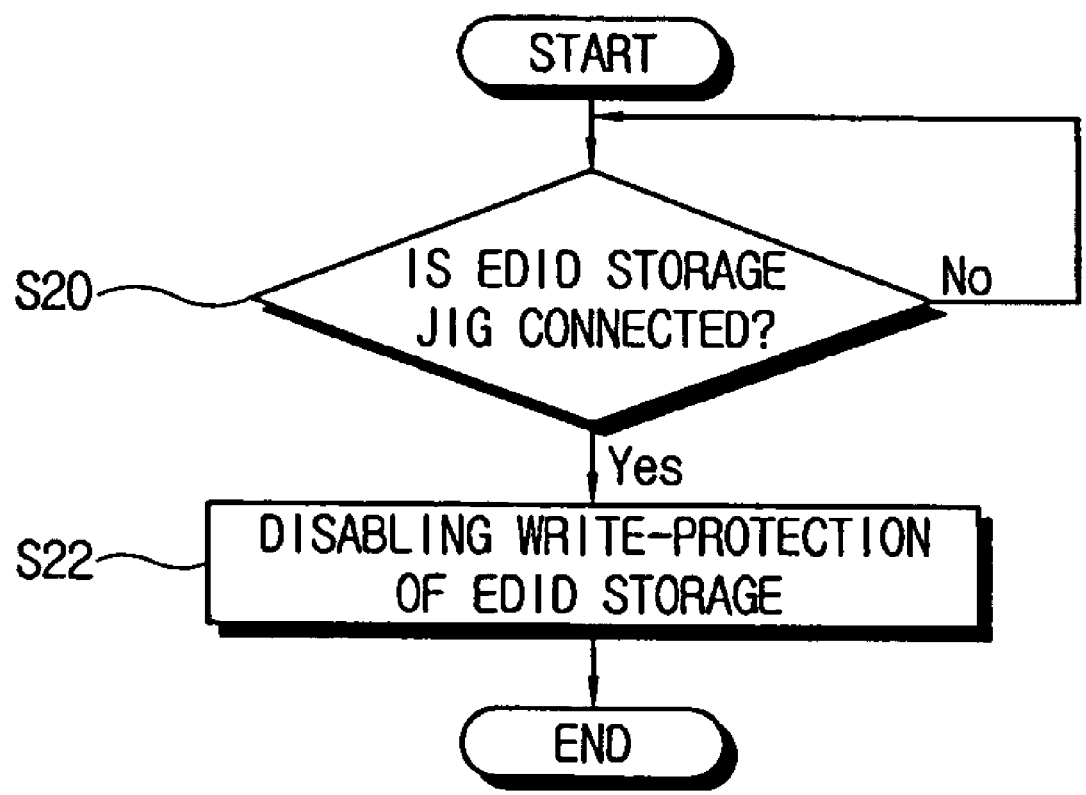

FIG. 11 is a control flowchart of operations performed in the display apparatus of FIG. 2 when the video card 18 is connected to the connector 11, and FIG. 12 is a control flowchart of operations performed in the display apparatus of FIG. 3 when the EDID storage jig 28 is connected to the connector 11.

As shown in FIG. 11, the microcomputer 12 can determine whether the video card 18 is connected to the connector 11, on the basis of the determining signal generated by the connector 11 in operation S10. When it is determined that the video card 18 is connected to the connector 11, the microcomputer 12 can transmit the enable signal to the WP port of the EDID storage 10 in operation S12, thereby preventing the error data from being written on the EDID storage 10. The microcomputer 12 can initialize the communication condition of the EDID storage 10 in operation S14.

Further, as shown in FIG. 12, the microcomputer 12 can determine whether the EDID storage jig 28 is connected to the connector 11, on the basis of the determining signal generated by the connector 11 in operation S20. When it is determined that the EDID storage jig 28 is connected to the connector 11, the microcomputer 12 can transmit the disable signal to the WP port of the EDID storage 10 in operation S22, thereby allowing the EDID transmitted from the EDID storage jig 28 to be written on the EDID storage 10.

Figure 4:
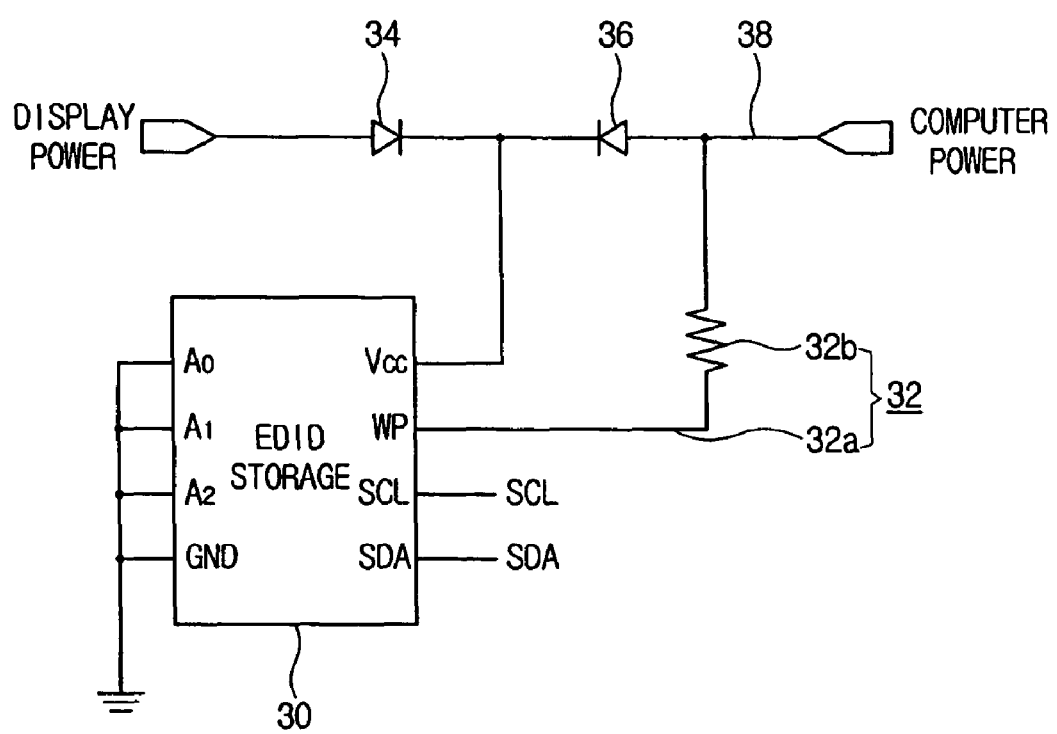
FIG. 4 is a block diagram of a display apparatus according to another embodiment of the general inventive concept.

FIG. 4 is a block diagram of a display apparatus according to another embodiment of the general inventive concept. As shown in FIG. 4, the display apparatus may include an EDID storage 30 having a Vcc port to receive a display power or a computer power through diodes 34 and 36, respectively, a WP port connected to a computer power line 38, a SCL port and a SDA port to form an $I^2C$ communication interface; and a current passage 32 to control the EDID storage 30 according to a determination of whether the computer power is supplied or not.

The current passage 32 can connect the computer power line 38 with the WP port and can lower a level of the computer power into a predetermined level through a resistor 32b when the computer power is supplied to the EDID storage 30 through the Vcc port, thereby transmitting a signal having a predetermined level to the WP port.

Such signal having the predetermined level and transmitted to the WP port when the computer power is supplied, is equivalent to a high signal.

Thus, when the computer power is supplied to the EDID storage 30 as a computer is turned on, accidental error data transmitted from the computer is prevented from being stored in the EDID storage 30.

Figure 5:
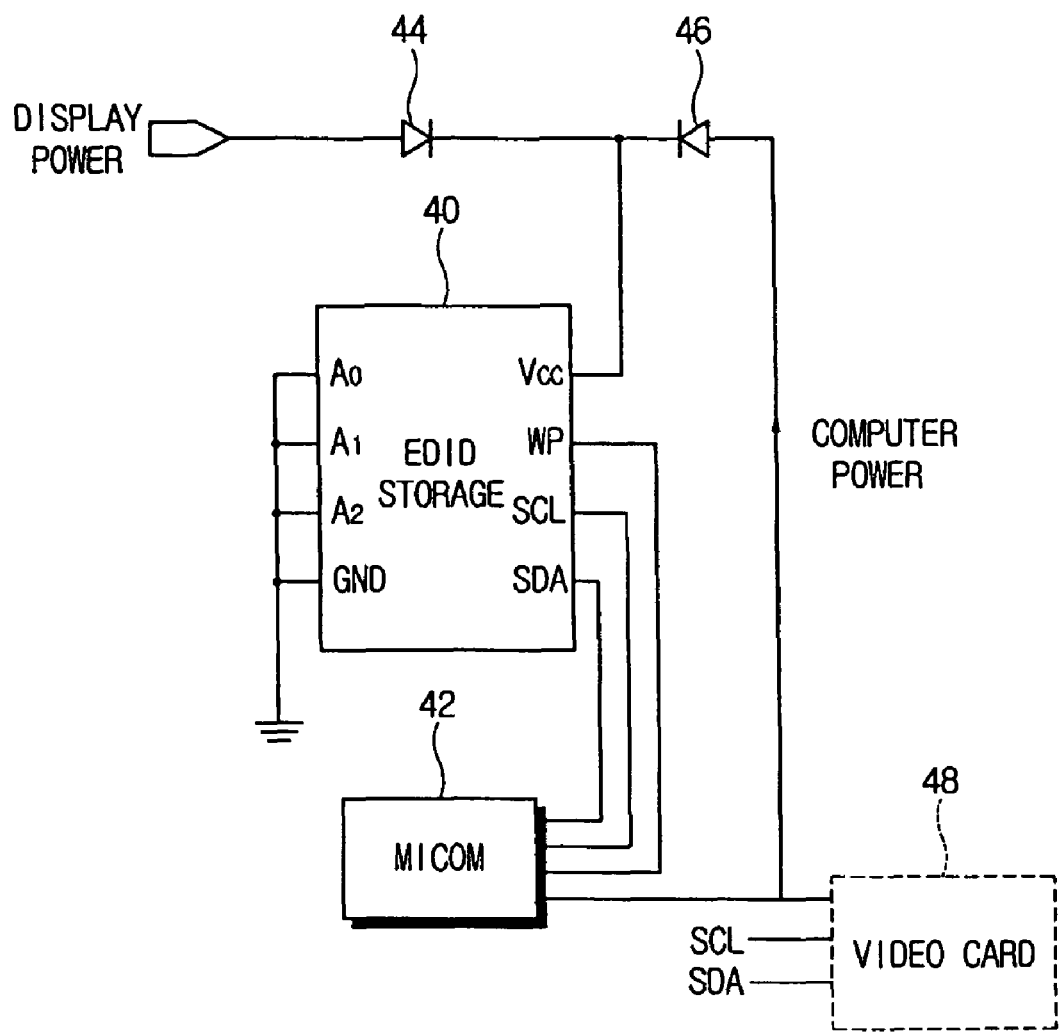
FIG. 5 is a block diagram of a display apparatus according to another embodiment of the general inventive concept.

FIG. 5 is a block diagram of a display apparatus according to another embodiment of the general inventive concept. As shown in FIG. 5, the display apparatus may include an EDID storage 40 having a Vcc port to receive a display power or a computer power through diodes 44 and 46, respectively, a WP port, and a SCL port and a SDA port to form an $I^2C$ communication interface, and a microcomputer 42 to control the EDID storage 40 according to whether the computer power is supplied or not.

The microcomputer 42 can determine whether the computer power is supplied from a video card 48 connected with a connector (not shown) through the Vcc port of the EDID storage 40, by an interrupt method or a polling method.

As a result of the determination, when it is determined that the computer power is supplied from the video card 48 to the EDID storage 40, the microcomputer 42 can transmit a high signal to the WP port, thereby preventing accidental error data transmitted from the computer from being stored in the EDID storage 40.

Further, in the case where it is determined that the computer power is supplied to the EDID storage 40, the microcomputer 42 determines whether an $I^2C$ line is accessible. As a result of this determination, when the $I^2C$ line is accessible, the microcomputer 42 can transmit a stop condition signal to both SCL and SDA ports so as to initialize a communication condition of the EDID storage 40.

Figure 13:
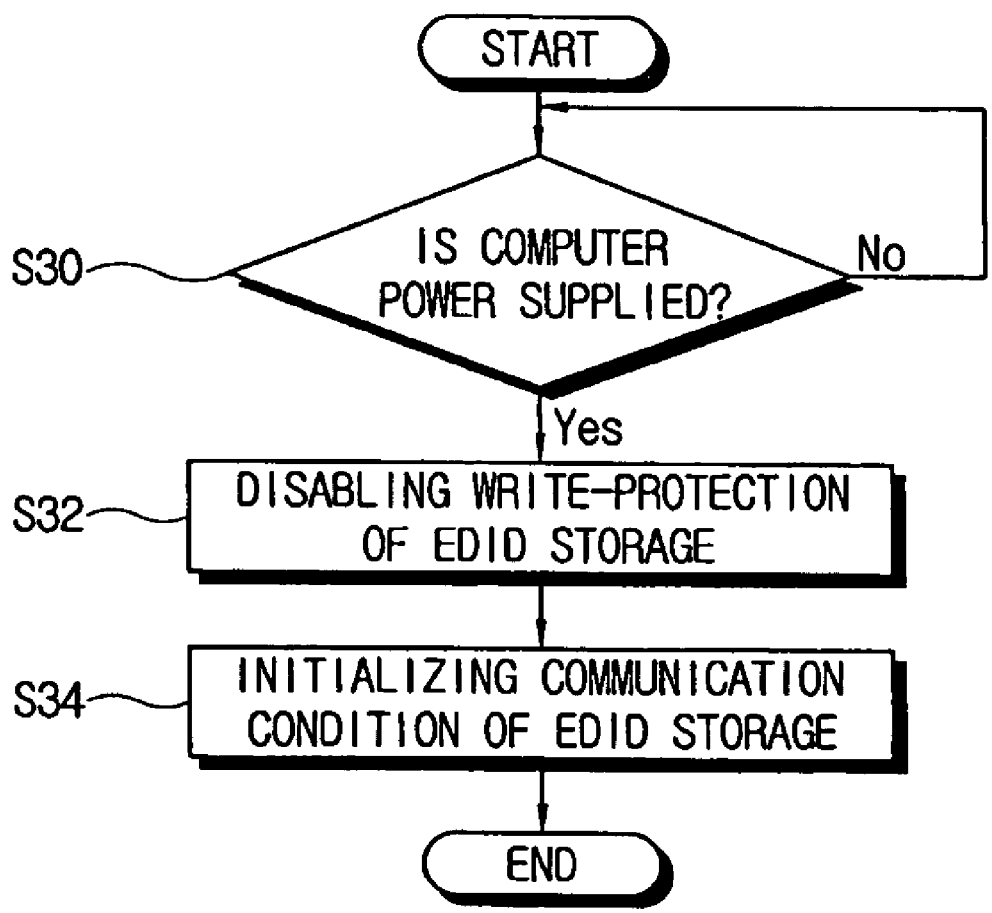
FIG. 13 is a method of operating the display apparatus of FIGS. 4 and 5 according to another embodiment of the general inventive concept.

With this configuration, operations of the display apparatus according to the embodiments of FIGS. 4 and 5 will be described hereinbelow with reference to FIG. 13.

First, the current passage 32 of FIG. 4 and the microcomputer 42 of FIG. 5 sense whether the computer power is supplied to the Vcc port in operation S30. When it is determined that the computer power is supplied to the Vcc port, the enable signal is transmitted to the WP port of the EDID storage 30 and 40 in operation S32, thereby preventing the error data from being written on the EDID storage 30 and 40. A communication condition of the EDID storage 30 and 40 can be initialized in operation S34, wherein the initialization is implemented by the microcomputer 42 of FIG. 5. Further, in the embodiment of FIG. 4, a controller may be provided to sense whether the computer power is supplied or not and to initialize a communication condition of the EDID storage 30.

Figure 6:
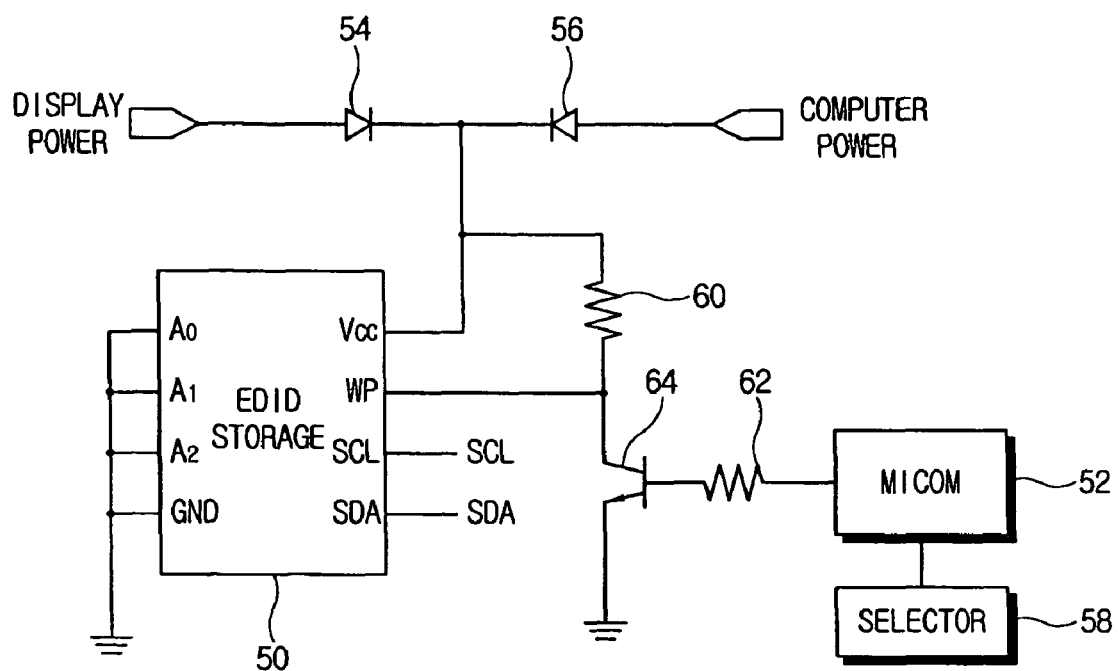
FIG. 6 is a block diagram of a display apparatus according to another embodiment of the general inventive concept.

FIG. 6 is a block diagram of a display apparatus according to another embodiment of the general inventive concept. As shown in FIG. 6, the display apparatus may include an EDID storage 50 having a Vcc port to receive a display power or a computer power through diodes 54 and 56, respectively, a WP port, a SCL port and a SDA port to form an $I^2C$ communication interface, a switch 64 switching the WP port between enable and disable modes, a selector 58 selecting the WP port to be disabled, and a microcomputer 52 to control the switch 64 according to supplying of the display power and selection of the selector 58.

In this embodiment, the WP port connected to the Vcc port becomes a high level when the computer power is supplied, so that accidental error data transmitted from the computer is prevented from being stored in the EDID storage 50.

Further, when it is determined that the WP port is selected to be disabled by the selector 58, the microcomputer 52 transmits a high signal to the switch 64 so as to turn on the switch 64, thereby grounding the WP port. Thus, the WP port can be disabled as necessary.

Here, the selector 58 is achieved by a hidden key combination of the display apparatus or a command of an EDID storage jig (not shown), etc. Therefore, the selector 58 may not be easily selected by a user, and can be selected in a manufacturing process or after-sales service.

Further, supposing that the EDID storage 50 of FIG. 6 is not supplied with the display power but the computer power, the WP port of the EDID storage 50 can be the high level, thereby preventing the error data from being written on the EDID storage 50.

However, when the EDID storage 50 is initially supplied with the display power while being supplied with the computer power, the microcomputer 52 can be reset, and an output port of the microcomputer 52 connected to the switch 64 can become a high level.

When the output port of the microcomputer 52 becomes a high level, the switch 64 illustrated as an NPN transistor in FIG. 6 is turned on. Hence, the WP port of the EDID storage 50 is grounded, so that there occurs a problem that a time interval in which writing is allowed is generated.

Figure 7A:
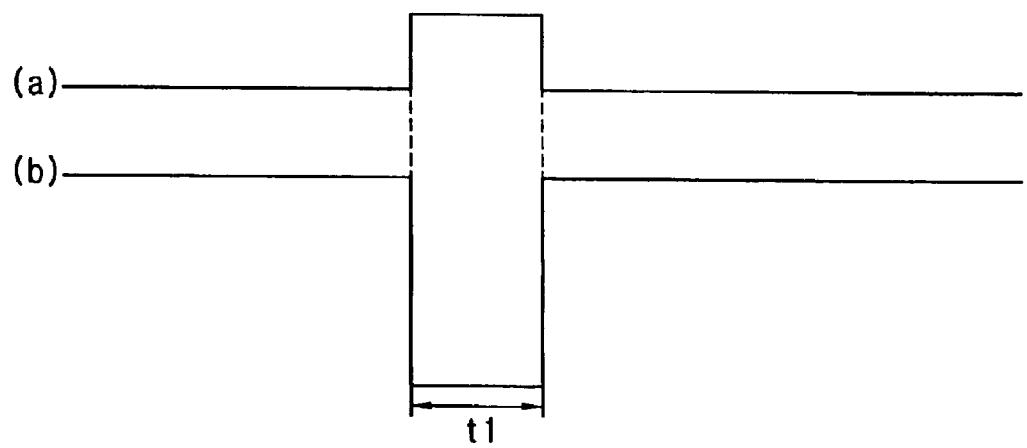
FIGS. 7A and 7B illustrate waveforms of signal levels of a port of a microcomputer and a WP port of the EDID storage in the display apparatus of FIG. 6.
Figure 7B:
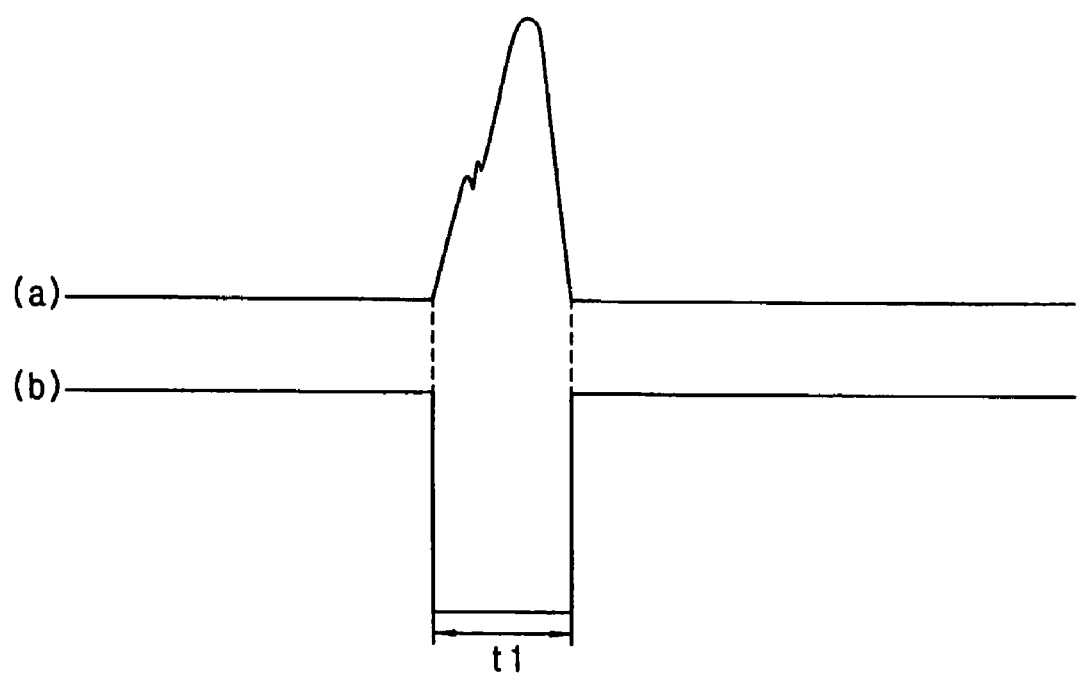

FIGS. 7A and 7B illustrate waveforms of signal levels of the port of the microcomputer 52 and the WP port of the EDID storage 50 of FIG. 6, and FIGS. 7A and 7B refer to a push-pull port and an open-drain port of the microcomputer 52, respectively.

As shown in a waveform of a signal level (a) of FIGS. 7A and 7B, when the EDID storage 50 is initially supplied with the display power while being supplied with the computer power, the port of the microcomputer 52 instantly becomes the high level during a time interval t1. Correspondingly, as shown in a waveform of a signal level (b) of FIGS. 7A and 7B, the WP port instantly becomes the low level during the time interval t1, thereby making the EDID storage 50 be writable. Therefore, error data may be written on the EDID storage 50.

Accordingly, in this embodiment of the present general inventive concept, when the display power is supplied to the EDID storage 50, the microcomputer 52 can be reset and can transmit the low signal to the switch 64, thereby turning off the switch 64. Therefore, the WP port can be connected to the Vcc port and can become a high level, and thus error data transmitted from the computer can be prevented from being written on the EDID storage 50 when the EDID storage 50 is initially supplied with the display power while being supplied with the computer power.

Figure 8:
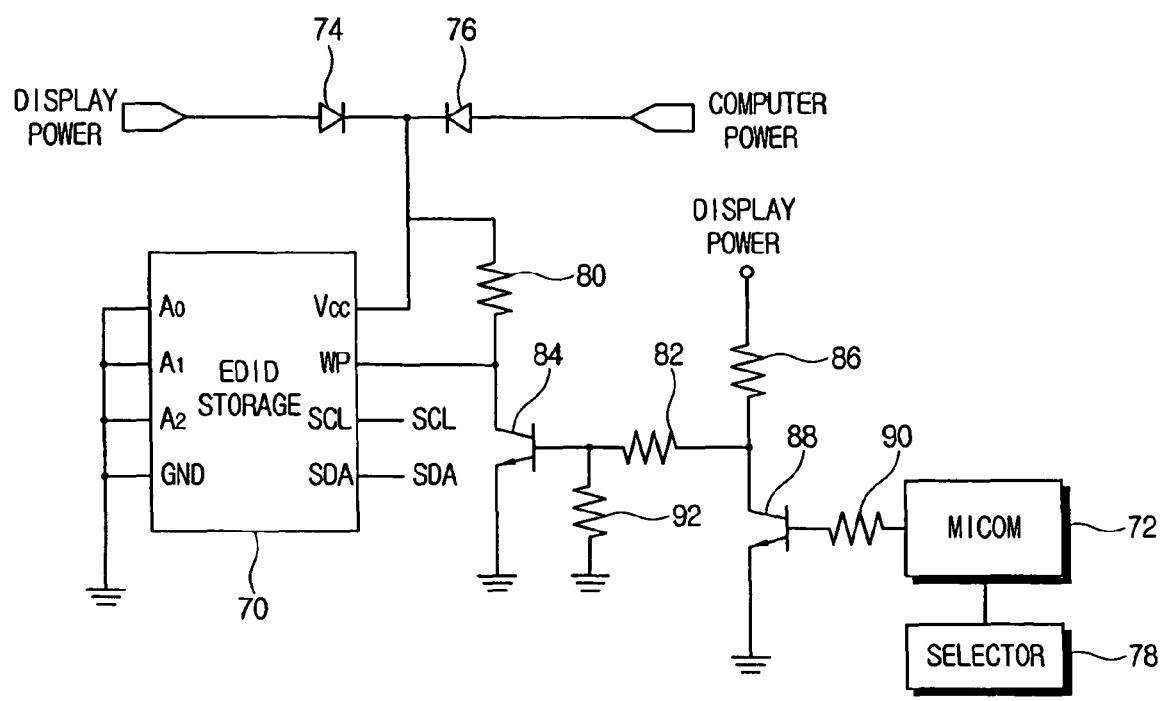
FIG. 8 is a block diagram of a display apparatus according to another embodiment of the general inventive concept.

FIG. 8 is a block diagram of a display apparatus according to another embodiment of the present general inventive concept. As shown in FIG. 8, the display apparatus may include a microcomputer 72 outputting a first control signal when a display power is initially supplied through a diode 74 while a computer power is being supplied through a diode 76, a first switch 88 switching to output a second control signal in response to the first control signal of the microcomputer 72, and a second switch 84 switching a WP port between enable and disable modes in response to the second control signal of the first switch 88.

When an EDID storage 70 is supplied with the display power while being supplied with the computer power through a Vcc port, a port of the microcomputer 72 connected to the first switch 88 can instantly become a high level, and thus the first switch 88 is turned on and transmits a ground signal to the second switch 84. When the second switch 84 receives the ground signal and is turned off, the WP port can be connected to the Vcc port and can become a high level. Therefore, a writable time interval in which the EDID storage 70 is writable, like the time interval t1 shown in a waveform of a signal level (b) of FIGS. 7A and 7B, can be prevented from being generated.

Meanwhile, when the microcomputer 72 determines that the WP port is selected to be disabled by the selector 78, the microcomputer 72 can transmit a low signal to the first switch 88, thereby turning off the first switch 88. Then, a high signal can be transmitted to the second switch 84, thereby turning on the second switch 84. Thus, the WP port can be grounded and can be disabled as necessary (for example, in the case when the EDID is stored in the EDID storage in the manufacturing process).

Figure 9:
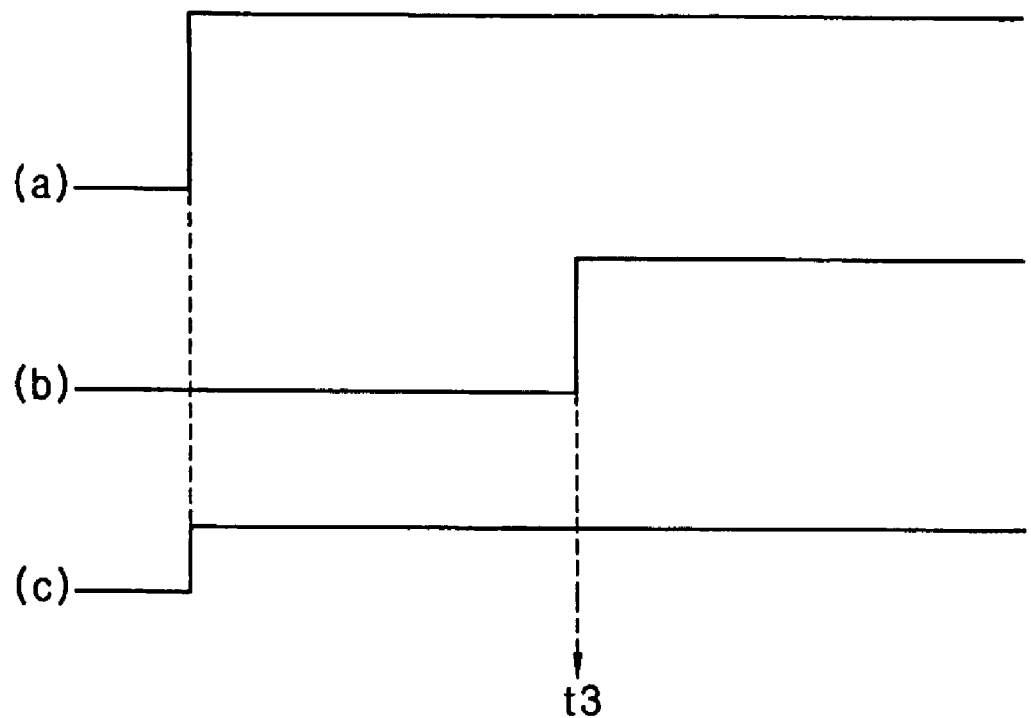
FIG. 9 illustrates waveforms of signal levels of a computer power, a port of the microcomputer, and a WP port of the EDID storage in the display apparatus of FIG. 8.

FIG. 9 illustrates waveforms of signal levels of the computer power, the port of the microcomputer 72, and the WP port of the EDID storage 70 according to another embodiment of the present general inventive concept. While the computer power is supplied as shown in a waveform of a signal level (a) of FIG. 9, the WP port may have a high level as shown in a waveform of a signal level (c), thereby protecting the EDID storage 70 from writing.

When the display power is supplied at t3, the port of the microcomputer 72 can instantly become a high level. In the display apparatus according to this embodiment of the present general inventive concept, the WP port can be kept in the high level even if the port of the microcomputer 72 instantly becomes a high level. Therefore, the writable time interval cannot be generated.

Figure 14:
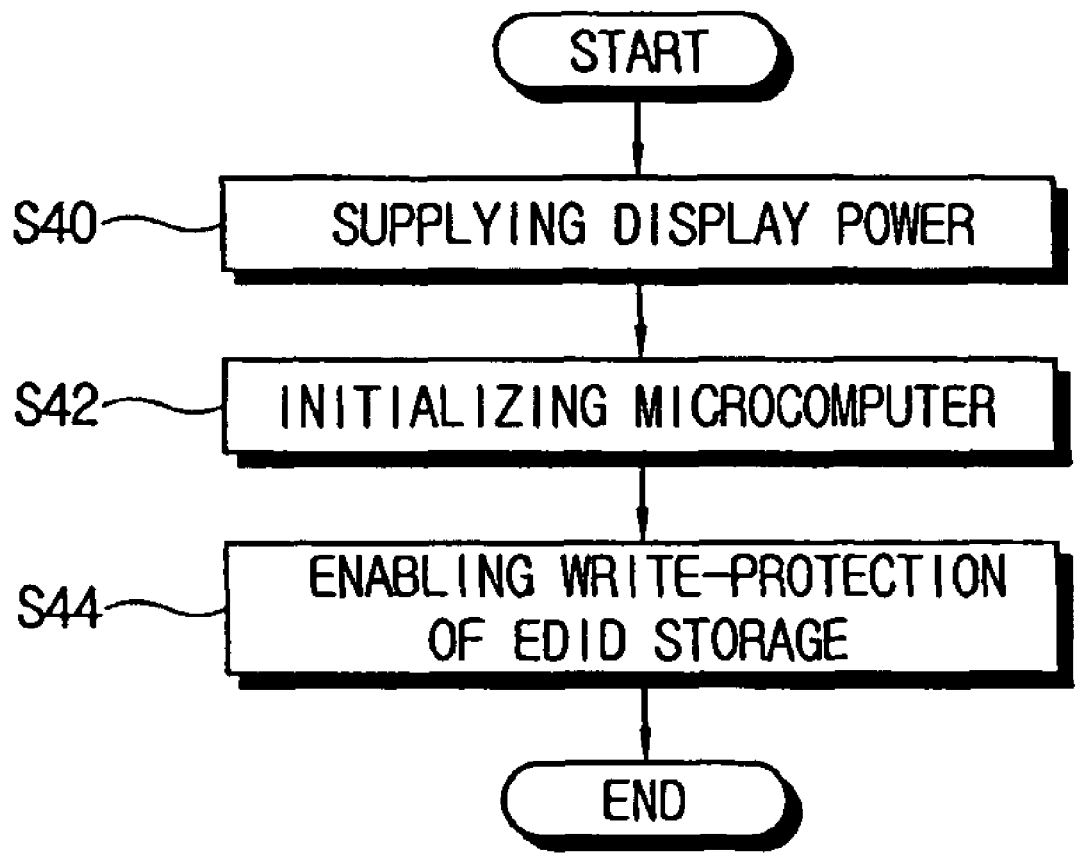
FIG. 14 is a method of operating the display apparatus of FIGS. 6 and 8 according to another embodiment of the general inventive concept.

With this configuration, operations of the display apparatus of FIGS. 6 and 8 will be described hereinbelow with reference to FIG. 14. Assuming that the computer power is being supplied to the EDID storage 50 and 70.

First, the display power can be supplied to the EDID storage 50 and 70 in operation S40, and thus, the microcomputer 52 and 72 can be initialized in operation S42. Then, microcomputer 52 and 72 can control the enable signal to be transmitted to the WP port of the EDID storage 50 and 70 in operation S44, thereby solving the problem that the WP port is disabled when the microcomputer 52 and 72 is reset.

In the above-described embodiments, the high signal is employed as the enable signal, and the low signal is employed as the disable signal. However, in the case where the WP port of the EDID storage is a low active port, a low signal may be employed as the enable signal, and a high signal may be employed as the disable signal.

Thus, the EDID storage is controlled to prevent error data transmitted from the computer through the connector from being stored in the EDID storage, thereby protecting the EDID storage from storing abnormal data.

As described above, the present general inventive concept provides a display apparatus and a method of controlling the same, which can prevent error data from being stored in an EDID storage.

Although a few embodiments of the present general inventive concept have been shown and described, it will be appreciated by those skilled in the art that changes may be made in these embodiments without departing from the principles and spirit of the invention, the scope of which is defined in the appended claims and their equivalents.

What is claimed is:

1. A display apparatus to communicate with a computer, comprising:
   a connector to generate a determining signal;
   a readable/writable EDID storage to store EDID; and
   a controller to control the EDID storage to be write-protected from error data transmitted from the computer based on the determining signal of the connector,
   wherein the EDID storage comprises a write-protect (WP) port, and the controller comprises a microcomputer to transmit an enable signal or a disable signal to the WP port according to the determining signal of the connector.

2. The display apparatus according to claim 1, wherein the connector is selectively connected with a video card of the computer or an EDID storage jig to store the EDID and outputs the determining signal according to a determination of what is connected to the connector, and the controller controls the EDID storage to be write-protected from the error data when the controller determines that the video card is connected, and controls the EDID storage to store the EDID transmitted from the EDID storage jig when the controller determines that the EDID storage jig is connected, on the basis of the determining signal.

3. The display apparatus according to claim 1 wherein the controller controls the EDID storage to initialize a communication condition of the EDID storage when the controller determines that the video card is connected, on the basis of the determining signal.

4. The display apparatus according to claim 3, wherein the EDID storage comprises an I²C line port, and the controller determines whether an I²C line is accessible when the video card is connected, and transmits a driving signal to the I²C line port to initialize the communication condition of the EDID storage when the I²C line is accessible.

5. The display apparatus according to claim 4, wherein the driving signal comprises a stop condition signal to stop data transmission.

6. The display apparatus according to claim 1, wherein the EDID storage comprises a power input port to receive a display power or a computer power, and the controller controls the EDID storage to be write-protected from the error data when the controller determines that the computer power is supplied through the power input port.

7. The display apparatus according to claim 6, wherein the EDID storage comprises a WP port, and the controller comprises a current passage to connect a computer power line with the WP port.

8. The display apparatus according to claim 6, wherein the EDID storage comprises a WP port, and the controller comprises a microcomputer transmitting an enable signal or a disable signal to the WP port according to whether the computer power is supplied.

9. The display apparatus according to claim 8, wherein the controller controls the EDID storage to initialize a communication condition of the EDID storage when the controller determines that the computer power is supplied.

10. The display apparatus according to claim 9, wherein the EDID storage comprises an I²C line port, and the controller determines whether an I²C line is accessible when the computer power is supplied, and transmits a driving signal to the I²C line port to initialize the communication condition of the EDID storage when the I²C line is accessible.

11. The display apparatus according to claim 10, wherein the driving signal comprises a stop condition signal to stop data transmission.

12. The display apparatus according to claim 1, wherein the EDID storage comprises a power input port to receive a display power or a computer power; and a WP port being enabled when the computer power is supplied through the power input port, and the controller controls the EDID storage to be write-protected from the error data when the controller determines that the display power is supplied while the computer power is supplied.

13. The display apparatus according to claim 12, further comprising:
a switch to switch the WP port between enable and disable modes, wherein the controller comprises a microcomputer to control the switch to enable the WP port when the controller determines that the display power is supplied.

14. The display apparatus according to claim 13, further comprising:
a selector to select the WP port to be disabled, wherein the controller controls the switch to disable the WP port according to selection of the selector.

15. The display apparatus according to claim 12, wherein the controller comprises a microcomputer to output a first control signal when the display power is initially supplied while the computer power is being supplied, a first switch to output a second control signal in response to the first control signal of the microcomputer, and a second switch to switch the WP port between enable and disable modes in response to the second control signal of the first switch.

16. A method of controlling a display apparatus comprising a connector to generate a determining signal and a readable/writable EDID storage to store EDID, the method comprising:
controlling the EDID storage to be write-protected from error data transmitted from a computer based on the determining signal of the connector,
wherein the controlling of the EDID storage comprises:
allowing the connector to output the determining signal according to whether the connector is selectively connected with a video card of the computer or an EDID storage jig to store the EDID; and
controlling the EDID storage to be write-protected from the error data when determined that the video card is connected, and controlling the EDID storage to store the EDID transmitted from the EDID storage jig when determined that the EDID storage jig is connected, on the basis of the determining signal of the connector.

17. The method according to claim 16, further comprising:
controlling the EDID storage to initialize a communication condition of the EDID storage when determined that the video card is connected, on the basis of the determining signal of the connector.

18. The method according to claim 16, wherein the controlling of the EDID storage comprises
controlling the EDID storage to be write-protected from the error data when determined that computer power is supplied.

19. The method according to claim 18, further comprising:
controlling the EDID storage to initialize a communication condition of the EDID storage upon determining that the computer power is supplied.

20. The method according to claim 16, wherein the controlling of the EDID storage comprises:
enabling a WP port when the EDID storage is supplied with computer power; and
controlling the EDID storage to be write-protected from the error data transmitted from the computer upon determining that display power is supplied.

21. The method according to claim 20, further comprising:
receiving a selection signal to disable the WP port; and
controlling the WP port to be disabled according to the selection signal.

22. A control unit of a readable/writeable storage unit to store data usable with a display apparatus, comprising:
a connector to generate a signal; and
a controller to control the readable/writable storage unit to be write-protected based on the signal received from the connector.

23. The control unit according to claim 22, wherein the storage unit is a EDID storage to store EDID.

24. The control unit according to claim 22, wherein the connector transmits a first determining signal when connected to a video card and a determining second signal when connected to an EDID storage jig.

25. The control unit according to claim 24, wherein the controller controls the storage unit to be write-protected when receiving the first determining signal and controls the storage unit to store the data when receiving the second determining signal.

* * * * *